United States Patent
Yeo

(10) Patent No.: US 10,353,217 B2
(45) Date of Patent: *Jul. 16, 2019

(54) CAMERA MODULE

(71) Applicant: LG INNOTEK CO., LTD., Seoul (KR)

(72) Inventor: In Jae Yeo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/679,795

(22) Filed: Aug. 17, 2017

(65) Prior Publication Data
US 2017/0343832 A1 Nov. 30, 2017

Related U.S. Application Data

(63) Continuation of application No. 14/904,595, filed as application No. PCT/KR2014/006235 on Jul. 11, 2014, now Pat. No. 9,766,476.

(30) Foreign Application Priority Data

Jul. 12, 2013 (KR) .......................... 10-2013-0082022

(51) Int. Cl.
*G02B 27/64* (2006.01)
*G03B 5/02* (2006.01)
(Continued)

(52) U.S. Cl.
CPC ............. *G02B 27/646* (2013.01); *G02B 7/08* (2013.01); *G02B 7/09* (2013.01); *G03B 3/10* (2013.01);
(Continued)

(58) Field of Classification Search
None
See application file for complete search history.

(56) References Cited

U.S. PATENT DOCUMENTS 6,344,148 B1 2/2002 Park et al.
8,817,116 B2 8/2014 Kim et al.
(Continued)

FOREIGN PATENT DOCUMENTS

CN 101860165 A 10/2010
CN 102087396 A 10/2010
(Continued)

OTHER PUBLICATIONS

International Search Report in International Application No. PCT/KR2014/006235, filed Jul. 11, 2014.
(Continued)

*Primary Examiner* — Derek S. Chapel
(74) *Attorney, Agent, or Firm* — Saliwanchik, Lloyd & Eisenschenk

(57) ABSTRACT

An embodiment provides a camera module comprising: a cover can which has a hollow part for exposing a lens at the upper part thereof and a fully opened surface at the lower part thereof; a base coupled to the lower part of the cover can; a housing that is disposed at the upper part of the base and moves in first and second directions that are mutually orthogonal on the surface perpendicular to an optical axis; a bobbin that is accommodated in the housing and moves in the direction of the optical axis, the bobbin comprising at least one lens; a magnet part disposed on the inner surface of the housing; a first coil pattern part disposed on the outer surface of the bobbin for moving the bobbin in the direction of the optical axis; an actuator comprising a second coil part disposed on the upper surface of the base for moving the housing accommodating the bobbin in the first and second directions; and a flexible substrate disposed between the second coil part and the base for respectively applying power to control the first coil pattern part and the second coil part.

17 Claims, 11 Drawing Sheets

(51) Int. Cl.
*G03B 3/10* (2006.01)
*G03B 17/02* (2006.01)
*G03B 5/00* (2006.01)
*H04N 5/225* (2006.01)
*G02B 7/09* (2006.01)
*G03B 13/36* (2006.01)
*G02B 7/08* (2006.01)

(52) U.S. Cl.
CPC ............... *G03B 5/00* (2013.01); *G03B 13/36* (2013.01); *G03B 17/02* (2013.01); *H04N 5/2252* (2013.01); *H04N 5/2253* (2013.01); *H04N 5/2254* (2013.01); *H04N 5/2257* (2013.01); *G03B 2205/0015* (2013.01); *G03B 2205/0069* (2013.01)

(56) References Cited

U.S. PATENT DOCUMENTS

| | | | |
|---|---|---|---|
| 9,013,588 B2 | 4/2015 | Moriya et al. | |
| 9,618,768 B2* | 4/2017 | Yeo | G03B 3/10 |
| 9,766,476 B2* | 9/2017 | Yeo | G03B 5/00 |
| 2007/0127325 A1 | 6/2007 | Yamashita | |
| 2011/0235196 A1 | 9/2011 | Ke | |
| 2011/0286732 A1* | 11/2011 | Hosokawa | G03B 3/02 396/55 |
| 2012/0147258 A1 | 6/2012 | Park | |
| 2012/0229926 A1* | 9/2012 | Wade | G02B 7/08 359/824 |
| 2013/0016427 A1 | 1/2013 | Sugawara | |
| 2013/0050828 A1* | 2/2013 | Sato | G02B 27/64 359/557 |
| 2014/0355120 A1 | 12/2014 | Yeo | |
| 2015/0296110 A1 | 10/2015 | Lee et al. | |
| 2015/0319345 A1 | 11/2015 | Park | |
| 2016/0011394 A1 | 1/2016 | Cho et al. | |
| 2016/0018624 A1 | 1/2016 | Yeo | |
| 2017/0168315 A1* | 6/2017 | Yeo | G02B 27/646 |
| 2018/0307001 A1* | 10/2018 | Park | H02K 33/18 |

FOREIGN PATENT DOCUMENTS

| | | | |
|---|---|---|---|
| CN | 102879973 A | 1/2013 | |
| CN | 102570762 A | 9/2015 | |
| CN | 102570762 B | 9/2015 | |
| KR | 10-2009-0128825 A | 12/2009 | |
| KR | 10-2012-0045846 A | 5/2012 | |
| KR | 10-2012-0061562 A | 6/2012 | |
| KR | 10-2012-0066264 A | 6/2012 | |
| WO | WO-2010/134706 A2 | 11/2010 | |
| WO | WO 2013062292 A1 * | 5/2013 | H02K 41/0356 |

OTHER PUBLICATIONS

Office Action dated Feb. 24, 2018 in Chinese Application No. 201480035199X.

Office Action dated May 27, 2019 in Chinese Application No. 201480035199.X.

* cited by examiner

CAMERA MODULE

CROSS-REFERENCE TO RELATED APPLICATIONS

This application is a continuation of U.S. application Ser. No. 14/904,595, filed on Jan. 12, 2016, which is a U.S. national stage application of International Patent Application No. PCT/KR2014/006235, filed on Jul. 11, 2014, which claims the benefit under 35 U.S.C. § 119 of Korean Patent Application No. 10-2013-0082022, filed on Jul. 12, 2013, which are hereby incorporated by reference in their entirety.

BACKGROUND

Field of the Disclosure

The present disclosure relates to a camera module of which structure is improved in consideration of OIS (Optical Image Stabilizer) function and AF (Auto Focus) function.

Discussion of the Related Art

When a user photographs with a photography device in hand, the user inevitably experience handshaking. Such handshaking causes shaking of the photography device, and therefore, blurs the photographed image and makes it difficult to focus an object in close range.

In order to overcome such vibration due to handshaking, the recent photography devices generally include an OIS (Optical Image Stabilizer) module for reducing the vibration due to handshaking that occurs when a user holds the photography device with hand and takes photograph. The OIS module compensates the handshaking when the user takes a photograph.

Recently, concomitant with extensive diffusion of mobile devices such as smart phones and tablet PCs, mobile camera modules capable of AF (AutoFocus) modulation and handshake compensation functions are being developed.

In general, a lens shift method to move the image sensor in horizontal directions according to the object moving in x, y-coordinates is used for the OIS module.

However, the lens shift method is a method where the AF module shakes a lens unit moving in a z-axis direction additionally in x, y-axis directions. Thus, a space for shaking the lens unit in x, y-axis is required in the AF module. Therefore, the conventional lens shift method has a problem in that the width of the camera module broadens to run against miniaturization and thinization of the photography device.

In addition, the conventional lens shift method has another problem in that an optical axis of the optical system trembles because the lens in the AF module is shaken in a horizontal direction.

SUMMARY OF THE DISCLOSURE

The present disclosure is conceived in order to solve out the problems mentioned in the above. One purpose of the present disclosure is to provide a camera module having fast and advanced reliability in comparison with the conventional AF and OIS functions and capable of miniaturization and thinization.

Another purpose of the present disclosure is to provide a camera module having a structure that is easy to assemble.

In a general aspect of the present disclosure, there is provided a camera module, the camera module comprising: a cover can formed at an upper side with a hollow portion to expose a lens, and formed at a lower side with a completely opened open surface; a base coupled to the lower side of the cover can; a housing disposed at an upper side of the base and formed to move in first and second directions mutually orthogonal on a surface perpendicular to an optical axis; a bobbin formed to move in an optical axis direction by being accommodated in the housing, and including at least one lens; an actuator including a magnet portion provided at an internal side surface of the housing, a first coil pattern portion provided at an external side surface of the bobbin in order to move the bobbin in the optical axis direction, and a second coil portion provided at an upper surface of the base in order to move the housing accommodating the bobbin in the first and the second directions; and a flexible substrate provided between the second coil portion and the base in order to apply electric power for respectively controlling the first coil pattern portion and the second coil portion.

In some exemplary embodiments of the present disclosure, the first coil pattern portion may be formed in a single coil pattern formed on the flexible substrate.

In some exemplary embodiments of the present disclosure, the first coil pattern portion may be formed in a two-coil pattern formed on the flexible substrate.

In some exemplary embodiments of the present disclosure, the first coil pattern portion may be formed in a four-coil pattern formed on the flexible substrate.

In some exemplary embodiments of the present disclosure, the base may include: a base body formed in a shape corresponding to a shape of an internal side surface of the cover can; an opening formed at a center of the base body; and a coupling portion surface-contacting the internal side surface of the cover can by being protruded on an external side of the base body.

In some exemplary embodiments of the present disclosure, the housing may include at least two lower stoppers formed by being protruded on a lower surface thereof, and the coupling portion of the base may include a plurality of recess portions formed to restrict movement of the housing in a downward direction, the first direction and the second direction by respectively accommodating the lower stopper.

In some exemplary embodiments of the present disclosure, the bobbin may include at least two flange portions each vertically formed on an external circumferential surface thereof, and the housing includes a plurality of accommodation portions formed to accommodate the flange portion by being formed on an internal side surface thereof at a predetermined interval.

In some exemplary embodiments of the present disclosure, the housing may include at least two upper stoppers each disposed adjacent to the cover can by being protrusively formed on an upper surface thereof.

In some exemplary embodiments of the present disclosure, the first coil pattern portion may be provided so as to face an internal side surface of the magnet portion, and the second coil portion may be provided so as to face a lower surface of the magnet portion.

In some exemplary embodiments of the present disclosure, the magnet portion may include at a center thereof a neutral portion formed in a direction perpendicular to an optical axis direction.

In some exemplary embodiments of the present disclosure, the second coil portion and the flexible substrate may be coupled by a soldering method, and the base body may include a solder ball accommodation groove formed to accommodate a solder ball generated when the second coil portion and the flexible substrate are coupled by the soldering method.

In some exemplary embodiments of the present disclosure, the second coil portion may be formed in a four-coil pattern.

In some exemplary embodiments of the present disclosure, the camera module may further comprise: an elastic unit formed to transfer the electric power applied by the flexible substrate to the first coil pattern portion, and to restrict movement of the bobbin in the optical axis direction, the first direction or the second direction.

In some exemplary embodiments of the present disclosure, the elastic unit may include: an upper spring provided at an upper portion of the housing; a lower spring provided at a lower portion of the housing; and at least two lateral surface springs provided between the housing and the base.

In some exemplary embodiments of the present disclosure, two of the lateral surface springs may be electrically connected to the flexible substrate, the two lateral surface springs may be electrically connected to the upper spring, and the upper spring may be electrically connected to one end and another end of a wound coil of the first coil pattern.

In some exemplary embodiments of the present disclosure, the camera module may further comprise: a Hall sensor portion configured to sense a movement of the actuator by being mounted on the flexible substrate.

In some exemplary embodiments of the present disclosure, the flexible substrate may include a Hall sensor accommodation groove formed to accommodate the Hall sensor portion.

In some exemplary embodiments of the present disclosure, the Hall sensor portion may be provided on a straight line with the magnet portion based on an optical axis.

In some exemplary embodiments of the present disclosure, the magnet portion may include four magnets formed at a predetermined interval of ninety degree, and the Hall sensor may be formed with two Hall sensors provided in response to mutually adjacent magnets.

In another general aspect of the present disclosure, there is provided a lens driving motor, the lens driving motor comprising: a base; a housing disposed at an upper side of the base and formed to move in first and second directions mutually orthogonal on a surface perpendicular to an optical axis; a bobbin formed to move in an optical axis direction by being accommodated in the housing, and including at least one lens; an actuator including a magnet portion provided at an internal side surface of the housing, a first coil pattern portion provided at an external side surface of the bobbin in order to move the bobbin in the optical axis direction, and a second coil portion provided at an upper surface of the base in order to move the housing accommodating the bobbin in the first and the second directions; and a flexible substrate provided between the second coil portion and the base in order to apply electric power for respectively controlling the first coil pattern portion and the second coil portion.

In some exemplary embodiments of the present disclosure, the first coil pattern portion may be formed in a single coil pattern formed on the flexible substrate.

In some exemplary embodiments of the present disclosure, the first coil pattern portion is formed in a two-coil pattern or a four-coil pattern formed on the flexible substrate.

In some exemplary embodiments of the present disclosure, the bobbin includes at least two flange portions each vertically formed on an external circumferential surface thereof, and the housing includes a plurality of accommodation portions formed to accommodate the flange portion by being formed on an internal side surface thereof at a predetermined interval.

In some exemplary embodiments of the present disclosure, the first coil pattern portion may be provided so as to face an internal side surface of the magnet portion, and the second coil portion may be provided so as to face a lower surface of the magnet portion.

In some exemplary embodiments of the present disclosure, the magnet portion may include at a center thereof a neutral portion formed in a direction perpendicular to an optical axis direction.

In some exemplary embodiments of the present disclosure, the second coil portion and the flexible substrate may be coupled by a soldering method, and the base body may include a solder ball accommodation groove formed to accommodate a solder ball generated when the second coil portion and the flexible substrate are coupled by the soldering method.

In some exemplary embodiments of the present disclosure, the lens driving motor may further comprise: an elastic unit formed to transfer the electric power applied by the flexible substrate to the first coil pattern portion, and to restrict movement of the bobbin in the optical axis direction, the first direction or the second direction.

In some exemplary embodiments of the present disclosure, the elastic unit may include: an upper spring provided at an upper portion of the housing; a lower spring provided at a lower portion of the housing; and at least two lateral surface springs provided between the housing and the base.

In some exemplary embodiments of the present disclosure, two of the lateral surface springs may be electrically connected to the flexible substrate, the two lateral surface springs may be electrically connected to the upper spring, and the upper spring may be electrically connected to one end and another end of a wound coil of the first coil pattern.

In some exemplary embodiments of the present disclosure, the lens driving motor may further comprise: a Hall sensor portion configured to sense a movement of the actuator by being mounted on the flexible substrate.

In some exemplary embodiments of the present disclosure, the flexible substrate may include a Hall sensor accommodation groove formed to accommodate the Hall sensor portion.

In some exemplary embodiments of the present disclosure, the magnet portion may include four magnets formed at a predetermined interval of ninety degree, and the Hall sensor may be formed with two Hall sensors provided in response to mutually adjacent magnets.

According to an exemplary embodiment of the present disclosure, an actuator that individually interacts with the magnet portion provided for auto focusing function is individually provided. Therefore, the camera module according to an exemplary embodiment of the present disclosure has advantages of fast and advanced reliability in comparison with the conventional AF and OIS functions.

In addition, according to an exemplary embodiment of the present disclosure, a lateral surface spring is provided so that the camera module according to an exemplary embodiment of the present disclosure has advantages of enhanced impact resistance and handshake prevention function.

In addition, according to an exemplary embodiment of the present disclosure, the second coil portion and the magnet portion are disposed on a straight line, so as to facilitate product assembly due to the mutual attractive force.

In addition, according to an exemplary embodiment of the present disclosure, a pattern coil is provided at an external circumferential surface of the bobbin, so that miniaturization and thinization of the camera module can be aimed.

DETAILED DESCRIPTION

Unless defined otherwise herein, all technical and scientific terms used herein have the same meaning as commonly understood by one of ordinary skill in the art to which this invention belongs. In a case when a term used herein conflicts with the customary meaning of the corresponding term, the meaning of the term defined herein shall supersede the customary meaning.

However, the terms mentioned herein are used merely for description of a particular exemplary embodiment. Thus, they are not intended to limit the scope of the present disclosure. Therefore, the definition of the terms shall be made based on the overall contents of the present disclosure. The same reference numbers are used throughout the present disclosure to refer to the identical elements of an exemplary embodiment.

A camera module according to an exemplary embodiment of the present disclosure has fast and advanced reliability in AF and OIS functions and may implement enhanced durability of the camera module. Hereinafter, such technical features of the present disclosure will be described in detail with reference to the enclosed drawing.

Figure 1:
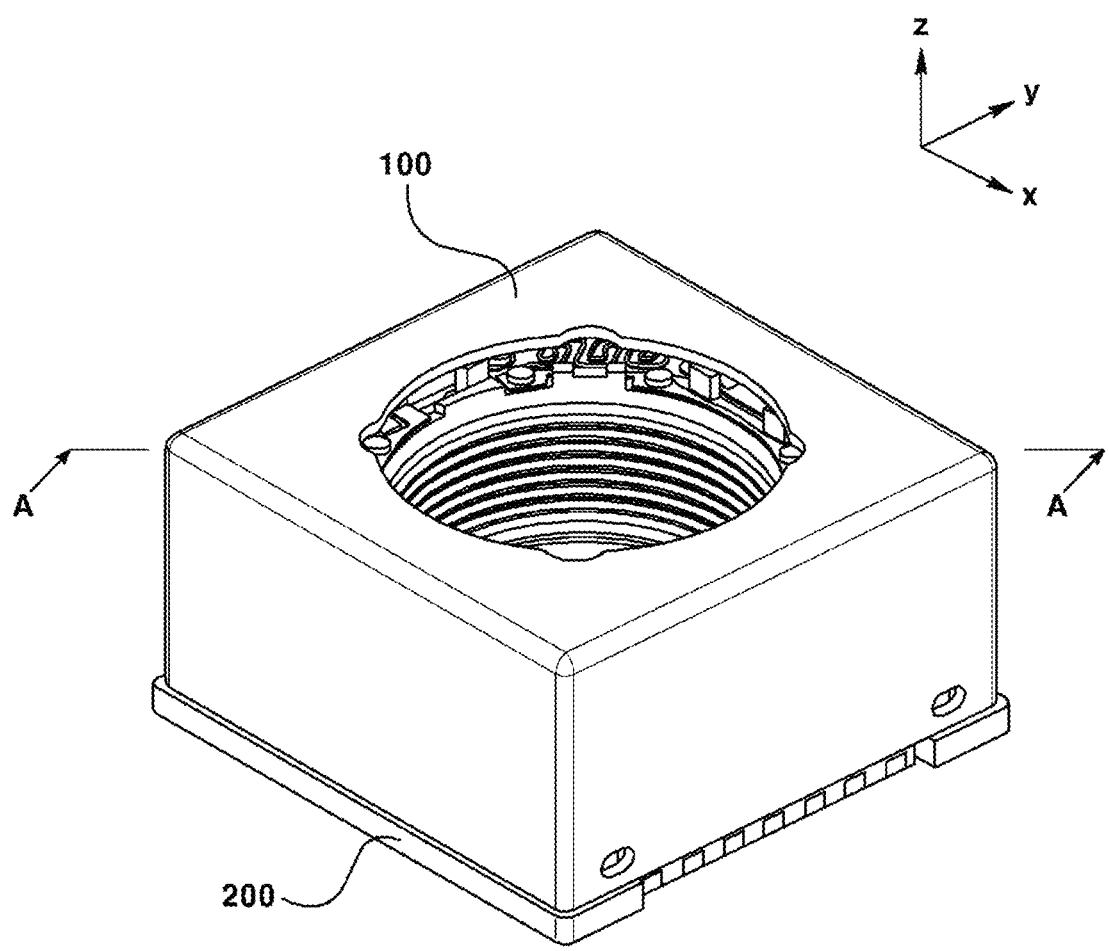
FIG. 1 is a combined perspective view illustrating a camera module according to an exemplary embodiment of the present disclosure.
Figure 2:
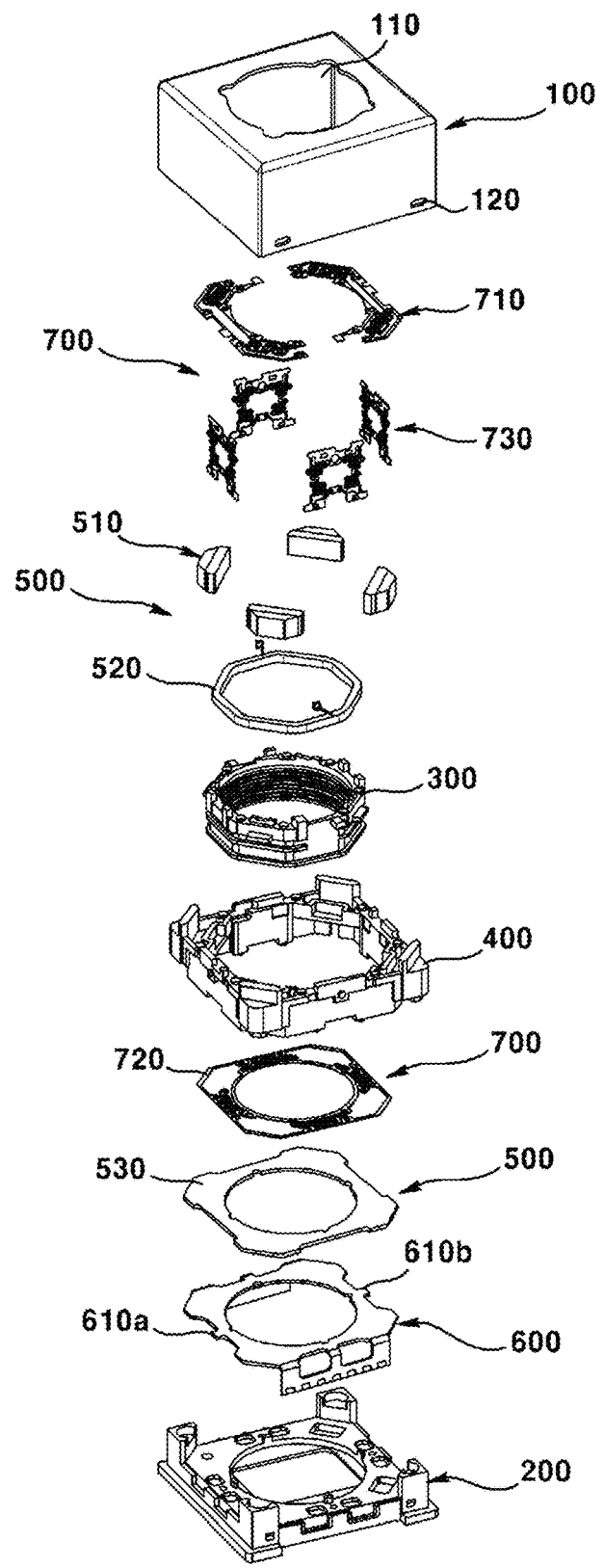
FIG. 2 is an exploded perspective view illustrating a camera module according to an exemplary embodiment of the present disclosure.

FIG. 1 is a combined perspective view illustrating a camera module according to an exemplary embodiment of the present disclosure; and FIG. 2 is an exploded perspective view illustrating a camera module according to an exemplary embodiment of the present disclosure.

Referring to FIG. 1, the z-axis herein refers to an optical axis direction, the x-axis herein refers to a first direction orthogonal to the z-axis, and the y-axis herein refers to a second direction respectively orthogonal to the z-axis and the x-axis.

Referring to FIG. 2, the camera module according to an exemplary embodiment of the present disclosure may broadly include a cover can (100), a base (200), a bobbin (300), a housing (400), an actuator (500), a substrate (600) and an elastic unit (700).

A hollow portion (110) to expose a lens is formed at an upper side of the cover can (100), and a completely opened open surface (not illustrated) is formed at a lower side of the cover can (100). The base (200) seals the open surface and is coupled to lower side of the cover can (100). The coupling method of these cover can (100) and base (200) will be described hereinafter.

The housing (400) is disposed at an upper side of the base (200) and moves in x, y-axis directions. The bobbin (300) moves in z-axis direction (optical axis direction) by being accommodated in the housing (400), and includes at least one lens.

In order for movement of such housing (400) and/or bobbin (300), the actuator (500) may include a magnet portion (510) portion provided at an internal side surface of the housing (400), a first coil pattern portion (520) provided at an external side surface of the housing (400) in order to move the bobbin (300) in a z-axis direction (the optical axis direction), and a second coil portion (530) provided at an upper surface of the base (200) in order to move the housing (400) accommodating the bobbin (300) in x, y-directions (the first and the second directions).

Meanwhile, the substrate (600) may be provided between the second coil portion (530) and the base (200), in order to apply electric power for respectively controlling the first coil pattern portion (520) and the second coil portion (530).

Meanwhile, the elastic unit may include an upper spring (710) provided at an upper portion of the housing (400), a lower spring (720) provided at a lower portion of the housing (400) and at least two lateral surface (730) springs provided between the housing and the base, so as to provide returning force to the bobbin (300) or the housing (400) and to supply the electric power applied by the substrate (600) to the first coil pattern portion (520).

Hereinafter, each of such elements according to an exemplary embodiment of the present disclosure will be described in further details.

Referring to FIGS. 1 and 2, the cover can (100) is formed at an upper side with a hollow portion (1100 to expose a lens, and formed at a lower side with an open surface (not illustrated).

The cover can (100) may be coupled to a coupling portion (220) (to be described hereinafter) of the base (200) with an internal side surface of the cover can (100) adhering to the coupling portion (220). In order for tighter coupling, at least one coupling hole (120) to be coupled to a coupling protrusion (221) (to be described hereinafter) of the base (200) may be formed at a lower portion of a lateral surface of the cover can (100).

Meanwhile, although the cover can (100) is illustrated herein as a hexahedron, the shape of the cover can (100) is not limited hereto.

Figure 3:
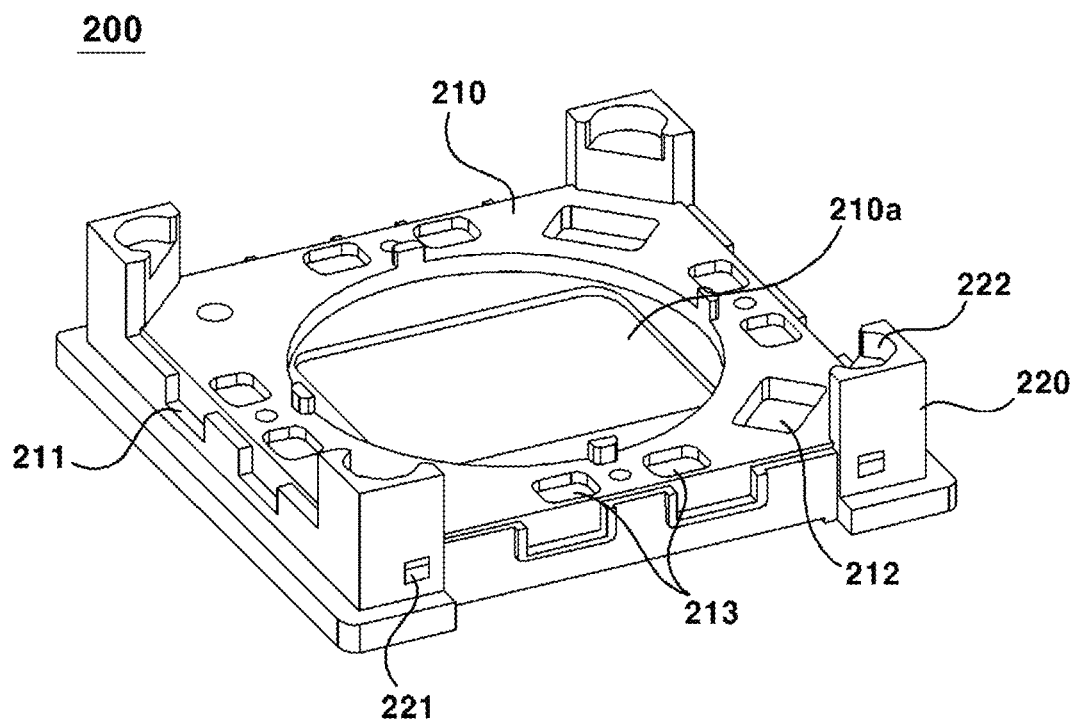
FIG. 3 is a perspective view illustrating a base according to an exemplary embodiment of the present disclosure.

FIG. 3 is a perspective view illustrating a base (200) according to an exemplary embodiment of the present disclosure.

The base (200) may be formed in a shape corresponding to a shape of the open surface of the cover can (100). According to an exemplary embodiment of the present disclosure, the base (200) is formed in a tetragonal shape. The base (200) is coupled to a lower side of the cover can (100) and supports the elements (to be described hereinafter) accommodated in the cover can (100) from below.

The base (200) may include a base body (210) formed in a shape corresponding to a shape of an internal side surface of the cover can (100), an opening (210a) formed at a center of the base body (210) and a coupling portion (220) surface-contacting the internal side surface of the cover can (100) by being protruded on an external side of the base body (210).

In order for tight coupling with the cover can (100), a coupling protrusion (221) may be formed at a lateral surface of the coupling portion (220). Otherwise in reverse, the coupling protrusion (221) may be formed at an internal lateral surface of the cover can (100), and the coupling hole (120) may be formed at the base (200).

In addition, a lateral surface spring insertion groove (211) in a shape of a slit for a second coupling portion (732) of the lateral surface spring (730) (to be described hereinafter) to be inserted to may be formed at each side of the base body (210).

In addition, the base body may include at an upper surface thereof a solder ball accommodation groove (213) formed to accommodate a solder ball (not illustrated) generated when the second coil portion (530) and the substrate (600) are coupled by a soldering method and a Hall sensor accommodation groove (212) to accommodate a Hall sensor portion (to be described hereinafter), so as to miniaturize an overall volume of the camera module.

A plurality of the solder ball accommodation grooves (213) may be formed at an upper surface of the base body (210) at a predetermined interval. The Hall sensor accommodation groove (212) may be formed on a straight line with a magnet portion (to be described hereinafter) based on the z-axis direction (see FIG. 9).

A recess portion (222) to restrict downward movement and x, y-axis rotary movement of the housing (400) by respectively accommodating a lower stopper (420) (to be described hereinafter) of the housing (400) may be formed at a free end of the coupling portion (220).

The recess portion (222) may be formed in a semicircular shape at a free end of the coupling portion (220). A lower surface of the recess portion (222) may restrict downward movement of the housing (400) along with the lower stopper (420) (to be described hereinafter), and a lateral surface of the recess portion (222) may restrict x, y-axis rotary movement of the housing (400).

Figure 4:
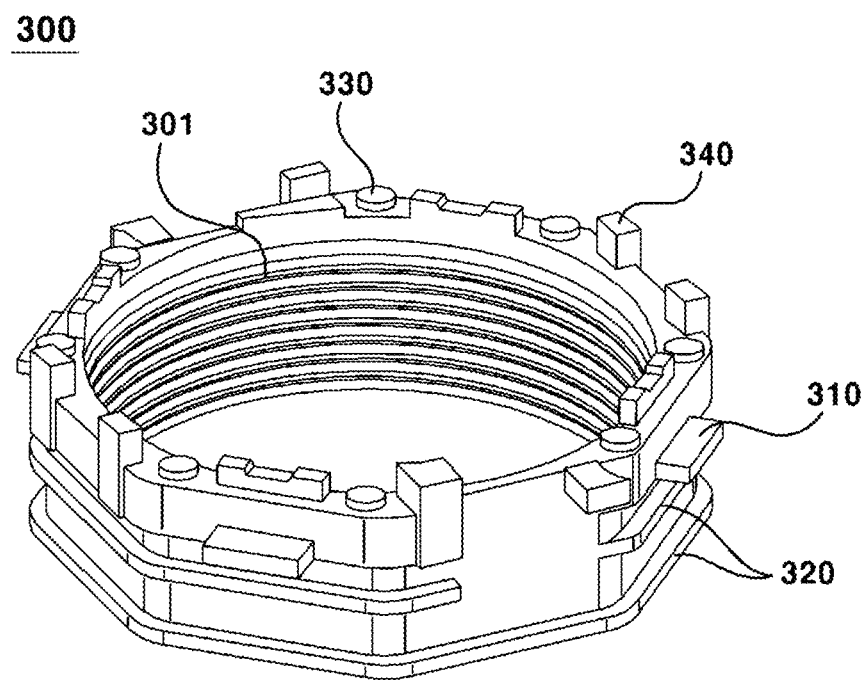
FIG. 4 is a perspective view illustrating a bobbin according to an exemplary embodiment of the present disclosure.

FIG. 4 is a perspective view illustrating a bobbin (300) according to an exemplary embodiment of the present disclosure.

Referring to FIG. 4, the bobbin (300) may be accommodated in the housing (400), and may include a lens barrel (not illustrated) to photograph a subject. The lens barrel may be formed as a case in a shape of a cylinder to fix at least one lens (not illustrated), and may be coupled at an internal side of the bobbin (300) by a screw thread (301) coupling, or otherwise, by a non-screw thread coupling method.

The bobbin (300) may move in an optical axis direction (z-axis direction) by the actuator (500) (to be described hereinafter).

Meanwhile, the bobbin (300) may include at least two flange portions (310) vertically protruded on an external circumferential surface thereof. The flange portion (310) may be accommodated in an accommodation portion (410) (to be described hereinafter) of the housing (400). Such structure may restrict downward movement of the bobbin (300).

The bobbin (300) may include at an external circumferential surface thereof a fixing rib (320) formed by being protruded for a first coil pattern portion (520) (to be described hereinafter) to be fixed at. Such fixing rib (320) may be formed at a lower side of the flange portion (310) on the external circumferential surface of the bobbin (300).

In addition, the bobbin (300) may include at an upper surface thereof at least two upper coupling protrusion (330) formed by being protruded in response to a upper coupling hole (712a) formed at a second support portion (712) of the upper spring (710) (to be described hereinafter), and at least two pre-stopper (340) formed by being protruded adjacent to the cover can (100).

Figure 5:
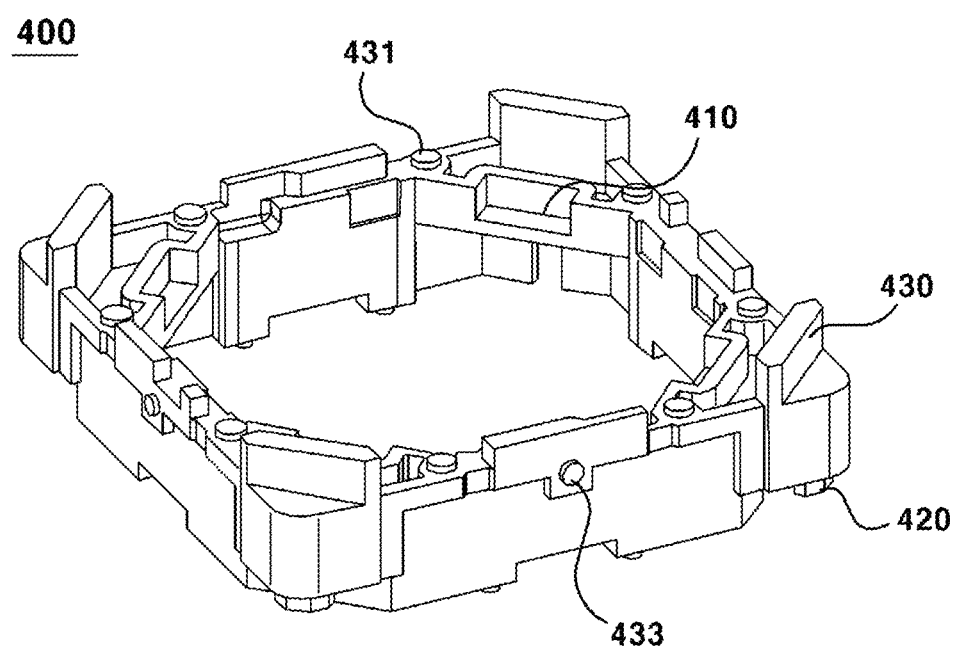
FIG. 5 is a perspective view illustrating a housing according to an exemplary embodiment of the present disclosure.

FIG. 5 is a perspective view illustrating a housing (400) according to an exemplary embodiment of the present disclosure.

Referring to FIG. 5, the housing (400) may be disposed on the base (200), so as to support the bobbin (300).

Figure 9:
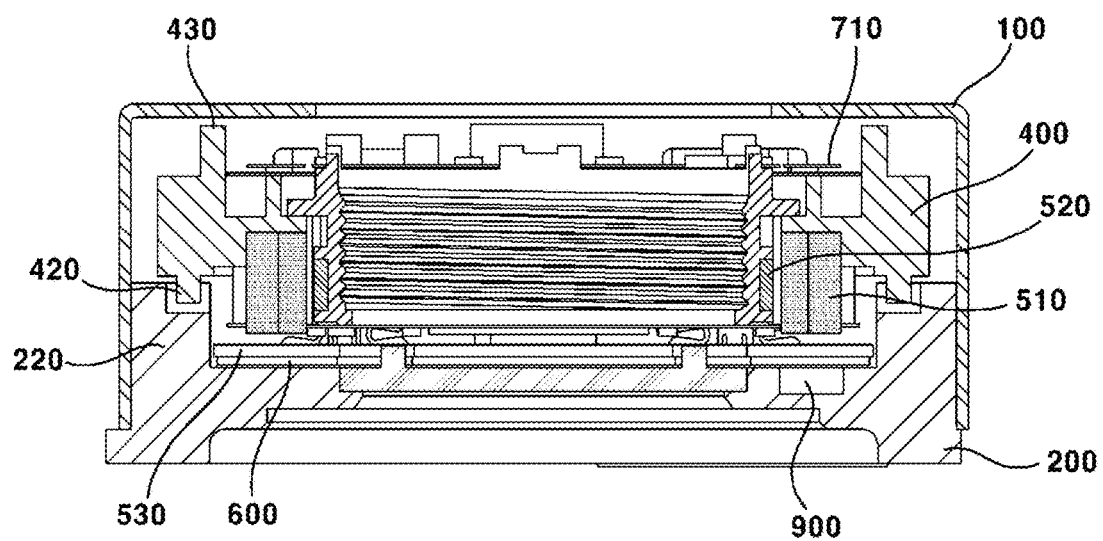
FIG. 9 is a lateral sectional view in a diagonal direction illustrating a camera module according to an exemplary embodiment of the present disclosure.

When electric power is applied to the camera module, the housing (400) may be disposed by being floating on the base (200) (see FIG. 9).

More specifically, the housing (400) may be formed in a shape corresponding to that of the base (200). Although it is illustrated herein that the base (200) and the housing (400) is in a tetragonal shape, the shape of that the base (200) and the housing (400) is not limited hereto.

A lateral coupling protrusion (433) to couple a first coupling portion (731) (to be described hereinafter) of the lateral spring (730) may be formed by being protruded on every lateral surface of the housing (400). In addition, a first coupling hole (731a) responding to the lateral coupling protrusion (433) may be formed at the first coupling portion (731) (to be described hereinafter) of the lateral spring (730).

In addition, an upper coupling protrusion (431) to couple an upper spring (710) (to be described hereinafter) may be formed by being protruded on every upper surface of the housing (400). In addition, an upper coupling hole (711a) responding to the upper coupling protrusion (431) may be formed at a first support portion (711) (to be described hereinafter) of the upper spring (710).

In addition, the housing (400) may include at an upper surface thereof at least two upper stoppers (430) each disposed adjacent to an upper internal surface of the cover can (100), and may include at a lower surface thereof at least two lower stoppers (420) each disposed by being floating on the recess portion (222).

The upper stopper (430) and the lower stopper (420) may be formed on a straight line based on z-axis so as to reinforce durability against impacts. In addition, the upper stopper (430) and the lower stopper (420) may be formed adjacent to the magnet portion (510) so as to prevent the housing (400) from being deformed by bending stress due to self-weight of the magnet portion (510).

In addition, the housing (400) may include an accommodation portion (410) formed at an internal side of a lateral surface thereof. A flange portion (310) of the bobbin (300) may be accommodated in the accommodation portion (410)

so as to restrict downward movement of the bobbin (300). The accommodation portion (410) may be formed in a shape of a rim and may be continuously protruded on an internal lateral surface of the housing (400). Otherwise, the accommodation portion (410) may be formed at a predetermined interval as illustrated in the drawing.

Figure 6:
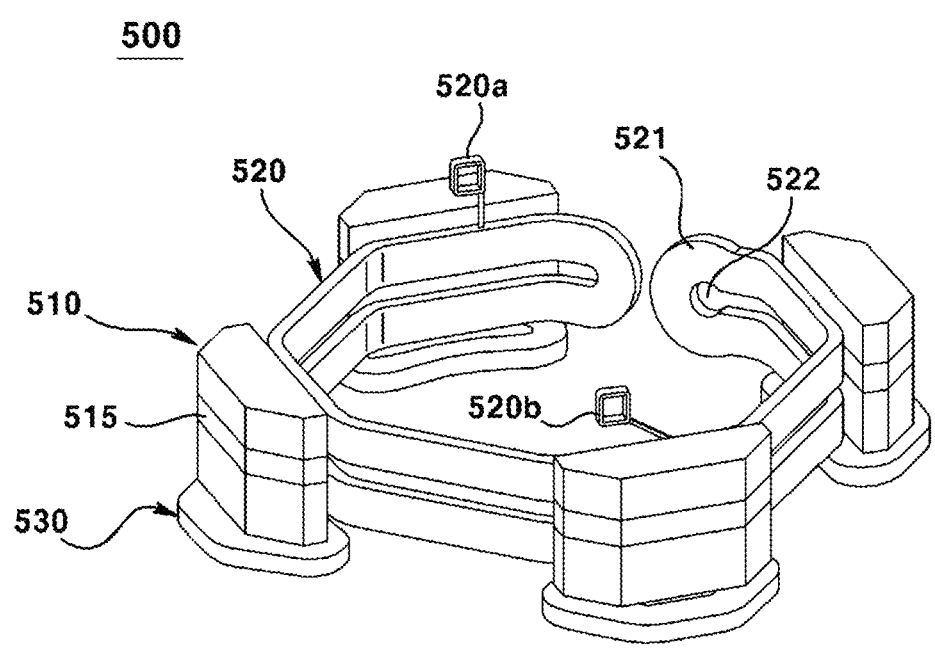
FIG. 6 is a schematic view illustrating an actuator according to an exemplary embodiment of the present disclosure.

FIG. 6 is a schematic view illustrating an actuator according to an exemplary embodiment of the present disclosure.

The actuator (500) according to an exemplary embodiment of the present disclosure may implement AF and OIS functions using two coil portions (520, 530) provided at the magnet portion (510).

As described in the above, the actuator (500) may include a magnet portion (510) provided at an internal side surface of the housing (400), a first coil pattern portion (520) provided at an external side surface of the bobbin (300) in order to move the bobbin (300) in the optical axis (z-axis) direction, and a second coil portion (530) provided at an upper surface of the base (200) in order to move the housing (400) accommodating the bobbin (300) in the first and the second directions (x, y-axis directions).

Here, the first coil pattern portion (520) may be provided so as to face an internal side surface of the magnet portion (510), and the second coil portion (530) may be provided so as to face a lower surface of the magnet portion (510).

More specifically, the first coil pattern portion (520) may be provided at an external circumferential surface of the bobbin (300), and may be electrically connected to the substrate (600) to be controlled.

That is, the first coil pattern portion (520) may form an electromagnetic field using the current applied to the wound coil and interact with the electromagnetic field of the magnet portion (510) so as to move the bobbin (300) upward and downward in the optical axis (z-axis) direction. Such upward and downward movement of the bobbin (300) may be restricted by the upper spring (710) and the lower spring (720).

The electric power applied to the first coil pattern portion (520) may be applied by sequentially passing through the substrate (600), a pair of the lateral springs (730) facing each other and electrically connected to the substrate (600), and the upper spring (710) electrically connected to the pair of the lateral springs (730) facing each other. Specific electrical coupling relations for such structure will be described hereinafter.

Meanwhile, the second coil portion (530) may be provided at an upper surface of the base (200) in order to move the housing accommodating the bobbin in the first and the second directions (x, y-axis directions).

More specifically, the second coil portion (530) may be electrically connected to the substrate (600) by being mounted on the substrate (600), and may be provided in a number of magnets of the magnet portion (510). In a case when the magnet portion (510) includes four magnets formed at a predetermined interval of ninety degree as illustrated in the drawing, four second coil portions (530) may be accordingly provided at a predetermined interval of ninety degree.

Each of such the four second coil portions (530) may be individually controlled by the substrate (600) (to be described hereinafter).

Of course, the second coil portion (530) may be required to be disposed on a straight line with the magnet portion (510) based on an optical axis (z-axis) in order to move the housing (400) in x, y-axis directions.

The current applied through the substrate (600) may flow to the wound coil of the second coil portion (530) to form an electromagnetic field, and may move the housing (400) in x, y-axis directions by interacting with the electromagnetic field of the magnet portion (510).

Meanwhile, the second coil pattern portion (530) may be formed in a pattern coil, in consideration of miniaturization of the camera module, in particular, lowering the height in the optical axis (z-axis) direction.

In such case, a lower surface of the second coil portion (530) may be mounted on the substrate (600) by being soldered at a lateral surface of the substrate (600). The solder ball generated during such soldering process may form a height in z-axis direction of the camera module. Therefore, the base (200) according to an exemplary embodiment of the present disclosure may include a solder ball accommodation groove (213) formed to accommodate the solder ball.

Here, the correlation of the actuator (500) according to an exemplary embodiment of the present disclosure will be described in the following.

Figure 10A:
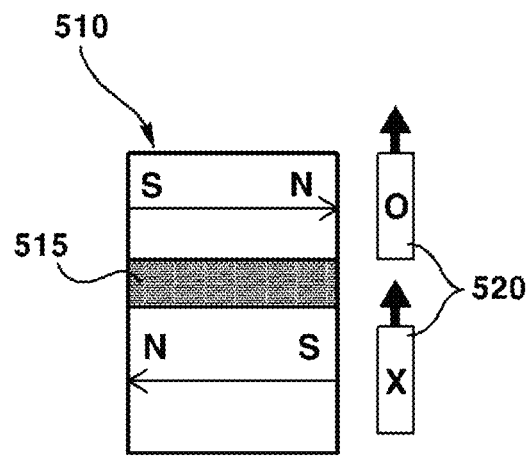
FIG. 10a is a schematic diagram illustrating a driving architecture of the actuator for moving the bobbin in z-axis according to an exemplary embodiment of the present disclosure.
Figure 10B:
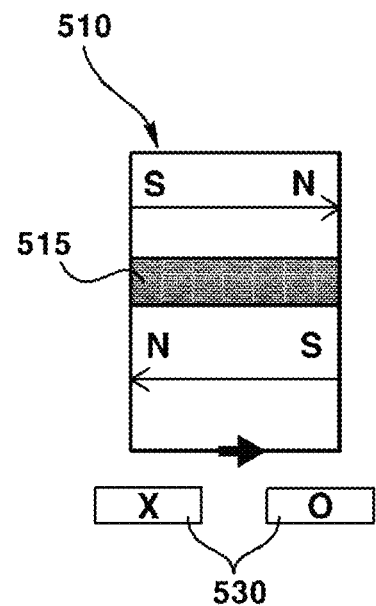
FIG. 10b is a schematic diagram illustrating a driving architecture of the actuator for moving the housing in x, y-axis according to an exemplary embodiment of the present disclosure.

FIG. 10a is a schematic diagram illustrating a driving architecture of the actuator (500) for moving the bobbin (300) in z-axis according to an exemplary embodiment of the present disclosure; and FIG. 10b is a schematic diagram illustrating a driving architecture of the actuator (500) for moving the housing (400) in x, y-axis according to an exemplary embodiment of the present disclosure.

Referring to FIGS. 6, 10a and 10b, the first coil pattern portion (520) may include a ring-shaped portion (521) and a slit portion (522) formed at a center of the ring-shaped portion (521). One end (520a) and another end (520b) may be formed by being protruded at an upper surface of the ring-shaped portion (521) in order to input and output the electric power applied by the substrate (600).

The ring-shaped portion (521) may be a pattern coil in a shape of a ring so as to lead the applied current to flow in a certain direction. The slit portion (522) may be a portion that forms a substrate of the ring-shaped portion (521) or may be removed by being cut-off. The substrate may be formed as a flexible printed circuit board which can be wound on an external circumferential surface of the bobbin (300).

Hereinafter, the movement of the bobbin (300) going upward and downward based on the z-axis will be described.

Referring to FIG. 10a, an upper part of the magnet portion (510) may have S-polarity at a left side (external side) thereof and N-polarity at a right side (internal side) thereof, and in reverse, a lower part of the magnet portion (510) may have N-polarity at a left side (external side) thereof and S-polarity at a right side (internal side) thereof. In such case, when the current inputted (O) from an upper part of the first coil pattern portion (520) flows downward to be outputted (X), the bobbin (300) may move upward due to influence of electromagnetic field of the magnet portion (510) and the first coil pattern portion (520).

It will be apparent that movement of the bobbin (300) in downward direction may be implemented by applying the current to the first coil pattern portion (520) in reverse direction, and the polarity of the magnet portion (510) may be reversely configured.

Hereinafter, the movement of the bobbin (400) going rightward and leftward based on the x, y-axis will be described.

Referring to FIG. 10b, an upper part of the magnet portion (510) may have S-polarity at a left side (external side) thereof and N-polarity at a right side (internal side) thereof, and in reverse, a lower part of the magnet portion (510) may have N-polarity at a left side (external side) thereof and S-polarity at a right side (internal side) thereof. In such case, when the current inputted (O) from the left side of the second coil portion (530) flows rightward to be outputted (X), the housing (400) may move rightward due to influence of electromagnetic field of the magnet portion (510) and the second coil portion (530).

It will be apparent that movement of the bobbin (300) in leftward direction may be implemented by applying the current to the second coil portion (530) in reverse direction, and the polarity of the magnet portion (510) may be reversely configured.

The magnet portion (510) may include at a center thereof a neutral portion (515) formed in a direction perpendicular to an optical axis (z-axis) direction, in order to minimize mutual interference between the first coil pattern portion (520) and the second coil portion (530).

The driving power of the camera module may be controlled by current control by the substrate (600), because the intensity of the driving is in inverse proposition to current, magnetic flux density, and interval between the coil and the magnet.

Meanwhile, the first coil pattern portion (520) of the present disclosure may be implemented in various exemplary embodiments.

Figure 11A:
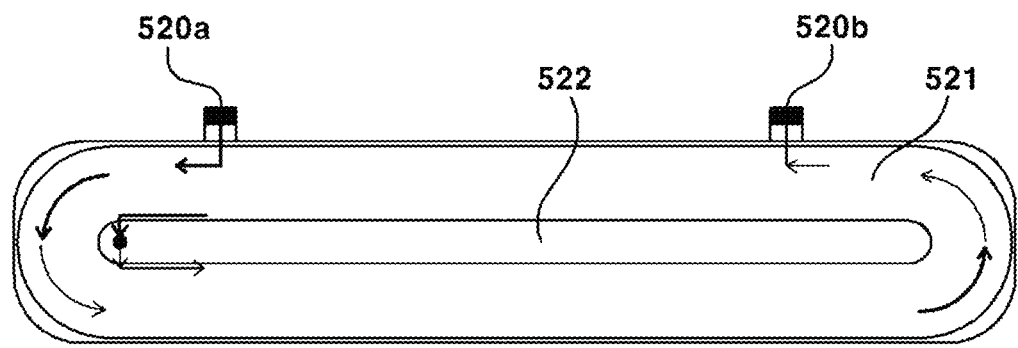
FIG. 11a is a schematic view illustrating a first coil pattern portion according to an exemplary embodiment of the present disclosure.
Figure 11B:
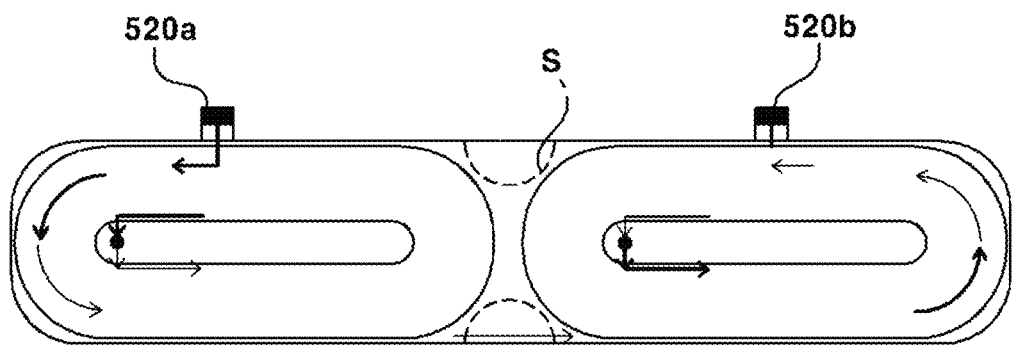
FIG. 11b is a schematic view illustrating a first coil pattern portion according to another exemplary embodiment of the present disclosure.
Figure 11C:
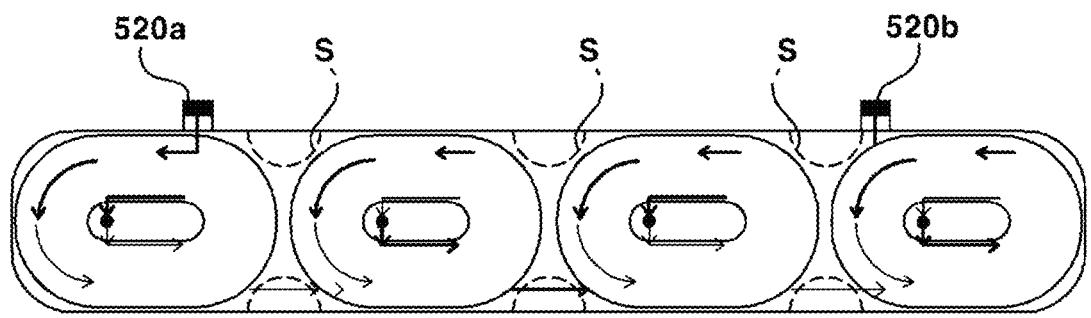
FIG. 11c is a schematic view illustrating a first coil pattern portion according to still another exemplary embodiment of the present disclosure.

FIG. 11a is a schematic view illustrating a first coil pattern portion according to an exemplary embodiment of the present disclosure; FIG. 11b is a schematic view illustrating a first coil pattern portion according to another exemplary embodiment of the present disclosure; and FIG. 11c is a schematic view illustrating a first coil pattern portion according to still another exemplary embodiment of the present disclosure.

As previously described, the first coil pattern portion (520) may be formed in a pattern coil on a flexible substrate, because the first coil pattern portion (520) is required to be wound on an external circumferential surface of the bobbin (300). In such case, as illustrated in FIGS. 11a-11c, the ring-shaped portion formed on the flexible substrate may be formed in a number of one, two or four. Meanwhile, unlike as illustrated, the ring-shaped portion may be formed in various numbers.

The first coil pattern portion (520) including two or more ring-shaped portions may remove the space (S) between each ring-shaped portion, and therefore has an advantage of securing the space in which the internal elements of the camera module can be further integrated.

Figure 7:
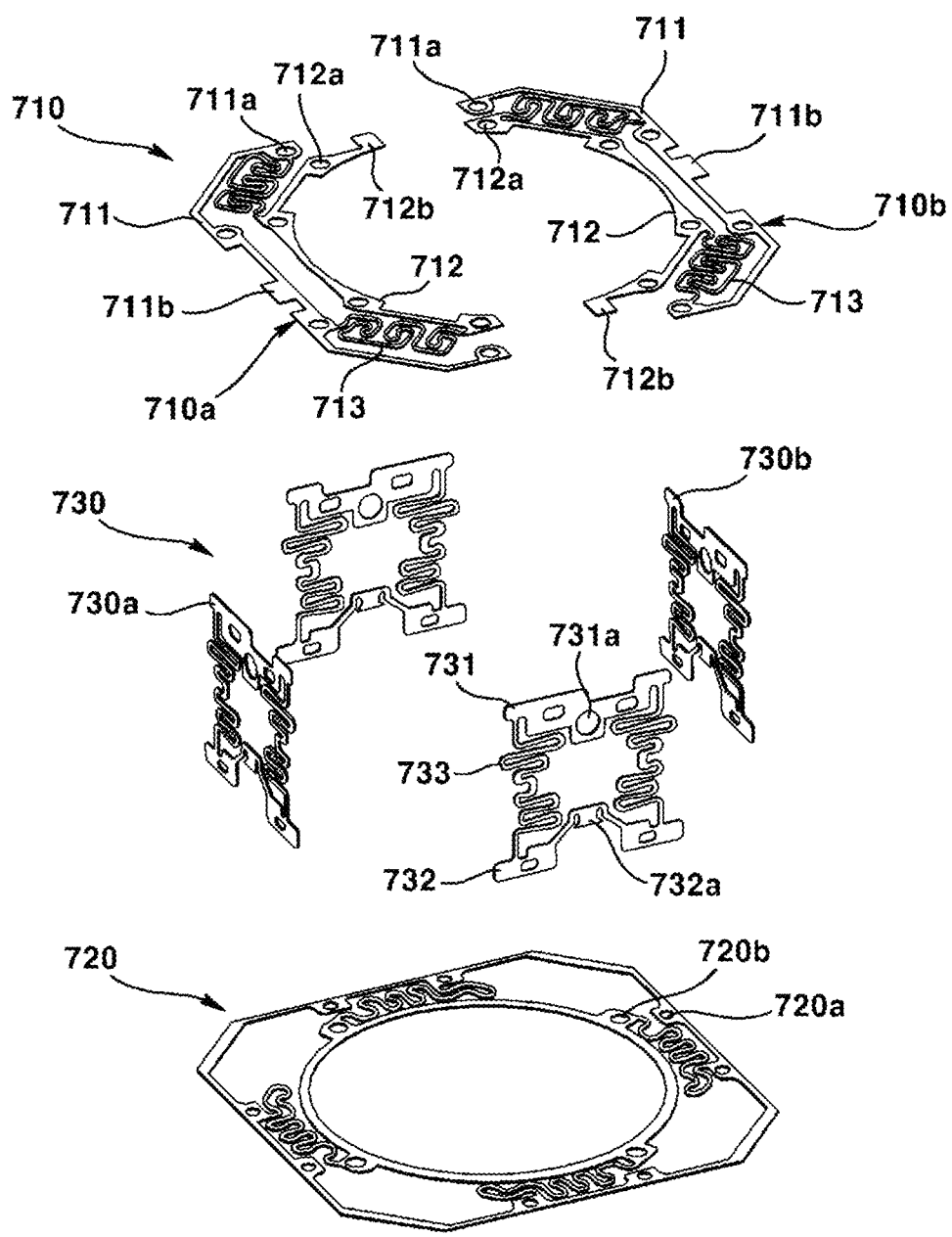
FIG. 7 is a view illustrating an elastic unit according to an exemplary embodiment of the present disclosure.

FIG. 7 is a view illustrating an elastic unit according to an exemplary embodiment of the present disclosure.

Referring to FIG. 7, the elastic unit (700) may include an upper spring (710), a lower spring (720) and a lateral spring (730).

The upper spring (710), the lower spring (720) and the lateral spring (730) may be arranged at each surface of the housing (400). These springs may be implemented as a general coil spring. Otherwise, each the upper spring (710), the lower spring (720) and the lateral spring (730) may be formed as a leaf spring in a shape where a single board material is formed by being bent and cut off, in order for higher production efficiency.

The upper spring (710) may be coupled at an upper surface of the housing (400) and an upper surface of the bobbin (300) to support the bobbin (300). The upper spring (710) may be provided at an upper portion of the housing (400) so as to provide returning force to the bobbin (300) when the bobbin (300) moves in upward direction.

More specifically, the upper spring (710) may include a power input member (710a) into which the electric power applied by the substrate (600) flows and a power output member (710b) from which the applied electric power is conducted the first coil pattern portion (520) and flows out.

The power input member (710a) and the power output member (710b) may be formed as leaf springs symmetrical to each other with the optical axis as a center. The power input member (710a) and the power output member (710b) may be formed as a unitary leaf spring. Otherwise, each of the power input member (710a) and the power output member (710b) may be formed as a separate leaf spring in order for independent input/output of the electric power.

Each of the power input member (710a) and the power output member (710b) of the upper spring (710) may include a first support portion (711) to be coupled to the housing (400), a second support portion (712) to be coupled to the bobbin (300), and an upper elastic portion (713) including at least one bending portion formed to electrically connect the first support portion (711) and the second support portion (712).

As illustrated in the drawing, the upper elastic portion (713) may be formed as two bending portions formed between the first support portion (711) and the second support portion (712).

As previously described, at least one upper coupling protrusion (431) may be formed on an upper surface of the housing (400), and at least one upper coupling hole (711a) responding to the upper coupling protrusion (431) may be formed at the first support portion (711).

In addition, a first protrusion portion (711b) to be electrically connected to the lateral spring (730) (to be described hereinafter) may be formed at the first support portion (711).

Meanwhile, at least one upper coupling protrusion (330) may be formed at an upper surface of the bobbin (300), and at least one upper coupling hole (711a) responding to the upper coupling protrusion (330) may be formed at the second support portion (712).

In addition, a second protrusion portion (712b) to be electrically connected to one end (520a) and another end (520b) of the coil wound on the first coil pattern portion (520) may be formed at each of the second support portions (712) connected to each of the power input member (710a) and the power output member (710b) of the upper spring (710).

A soldering method may be used to electrically connect the first protrusion portion (711b) with the lateral spring (730), and to electrically connect the second protrusion portion (712b) with one end (520a) and another end (520b) of the coil.

Meanwhile, the lower spring (720) may be provided at a lower portion of the housing (400) in order to support the lower side of the bobbin (300). The lower spring (720) may be formed as a single leaf spring, because the electrical power of the substrate (600) is inputted or outputted in the lower spring (720). The lower spring (720) may also include at least two lower holes (720a, 720b) to be coupled to protrusions (not illustrated) formed at a lower surface of the bobbin (300).

Meanwhile, in order for vibration attenuation of the x, y-axis, one side of the upper spring (730) may be coupled to a lateral surface of the housing (400) and another side of the upper spring (730) may be coupled to a lateral surface of the base (200). Four of such lateral springs (730) may be provided and arranged at a predetermined interval of ninety degree angle.

More specifically, each of the lateral springs (730) may respectively include a first coupling portion (731) to be coupled to a lateral surface of the housing (400), a second coupling portion (732) to be coupled to a lateral surface of the base (200), and an elastic portion (733) formed perpendicular to the first coupling portion (731) and the second coupling portion (732).

The elastic portion (733) may include at least one bending portion formed thereat. Two of the elastic portions (733) in shapes facing each other may be formed in a single lateral spring (730).

A first coupling hole (731a) responding to the lateral coupling protrusion (433) formed at the housing (400) may be formed at the first coupling portion (731) of the lateral spring (730).

Likewise, the second coupling portion (732) may be coupled to the base (200) in the same manner as for the first coupling portion (731).

Otherwise, as previously described, the second coupling portion (732) may be coupled to the base (200) by a process where a lateral surface spring insertion groove (211) in a shape of a slit having the same width as that of the second coupling portion (732) is formed and the second coupling portion (732) is coupled by sliding in the lateral surface spring insertion groove (211).

At least two lateral springs (730) facing each other may be provided at lateral surfaces of the housing (400) and the base (200). Four of the lateral springs (730) may be respectively provided at each of four sides of the housing (400).

Here, two of the second coupling portions (732) in two of the lateral springs (730a, 730b) among the lateral springs (730) may be respectively and electrically connected to the substrate (600). The first coupling portions (731) in two of the lateral springs (730a, 730b) may be respectively and electrically connected to the upper spring (710). The upper spring (710) may be electrically connected to one end (520a) and another end (520b) of the wound coil of the first coil pattern portion (520).

Such structure for applying electric power to the first coil pattern (520) does not require any additional or separate power supply cable, and therefore has advantages in that reliability and durability of the camera module can be enhanced and miniaturization of the product can be realized.

The substrate (600) may include tow soldering points (610a, 610b, see FIG. 2) formed to electrically connect to each of the second coupling portions (732) in two of the lateral springs (730a, 730b). Each of the two second coupling portions (732) may respectively include a soldering portion (732a) formed to be soldered with the soldering points (610a, 610b).

Figure 8:
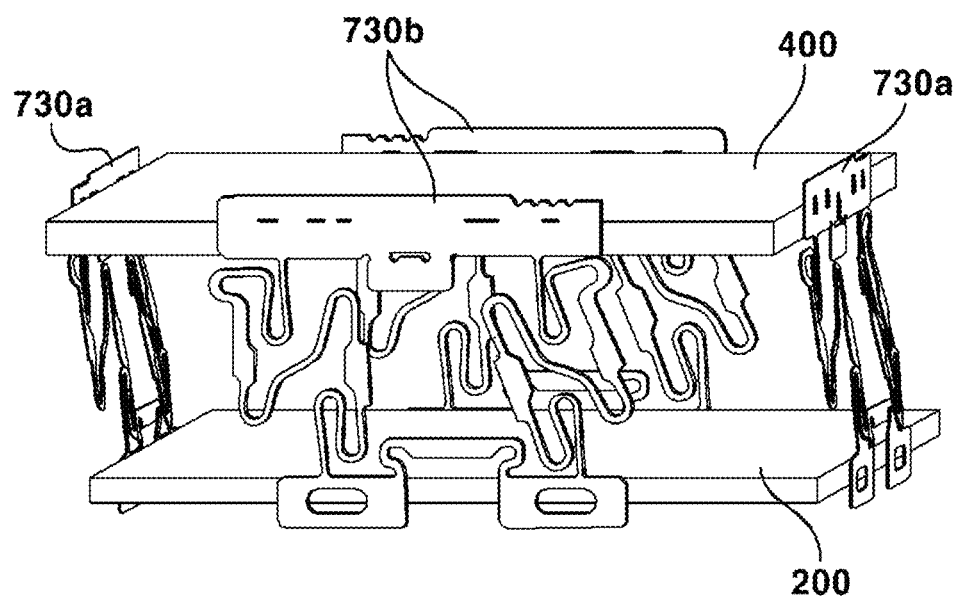
FIG. 8 is a modified perspective view illustrating a lateral surface spring for understanding of an exemplary embodiment of the present disclosure.

FIG. 8 is a modified perspective view illustrating a lateral surface spring for understanding of an exemplary embodiment of the present disclosure.

When referring to the illustration of FIG. 8, the lateral spring (730) is being forced in leftward direction. Here, the lateral springs (730a) at both sides are being forced in fx direction, and the lateral springs (730b) at front and rear sides are being forced in fy direction.

One end and another end of the elastic portion (733) in each of all the lateral springs (730) may be required to be disposed on a vertical line to the first and second coupling portions (731, 732) that are horizontally formed. At least one bending portion that is the elastic portion (733) may be formed in the middle of the first and second coupling portions (731, 732). Such structure may be satisfied with the following conditional equation.

$Kx=0.5\sim2.0Ky$ $Kz=5\sim100Kx$, <Conditional Equation> where K is a spring constant.

To sum up, the spring constant in x-axis direction and the spring constant in y-axis direction may be approximately the same, and the spring constant in z-axis direction may have a value five to one hundred times larger than those of the spring constants in x, y-axis direction.

Such conditional equation is based on the formula of f=Kx. Here, f is force of the magnet and coil, and x is moving distance. That is, the bobbin may move by the f value when the K value is small. The spring constant that is such K value may be considered in every x, y, z-axis direction.

The reason why the movement in z-axis direction is considered for the lateral spring (730) for providing returning force with respect to movement in x, y-axis directions is in order to consider weight of the bobbin (300) itself which accommodates the lens. In addition, it is also in order to consider the case when the direction of photographing camera faces the ground or the sky.

Meanwhile, referring to FIG. 1, the substrate (600) may be provided on the base (200) by being coupled to an upper side of the base (200) in order to control the actuator (500). An image sensor (not illustrated) and various elements to convert optical signals introduced through the lens to electrical signals may be mounted on the substrate (600).

In addition, the substrate (600) may include two soldering points (610a, 610b) to be electrically connected to the lateral spring (730) in order to apply electric power to the first coil pattern portion (520). As described in the above, the soldering points (610a, 610b) may be electrically connected by being soldered with soldering portion (732a) formed at the second coupling portion (732) of the lateral spring (730).

The camera module according to an exemplary embodiment of the present disclosure has advantageous effects of implementing fast and outstanding AF and OIS functions by a process of separately driving two coil portions (520, 530), that is, separately driving the first coil pattern portion (520) to move the bobbin (300) in z-axis direction (optical axis direction) and the second coil portion (530) to move the housing (400) accommodating the bobbin (300) in x, y-axis directions.

Here, the structure and coupling relation of the camera module according to an exemplary embodiment of the present disclosure will be detailedly described in the following.

FIG. 9 is a lateral sectional view in a diagonal direction illustrating a camera module according to an exemplary embodiment of the present disclosure. That is, FIG. 9 is a cutaway end view along section A-A of FIG. 1.

Referring to FIG. 9, the housing (400) and the base (200) may be formed in shapes corresponding to the shape of an internal surface of the cover can (100). Therefore, the housing (400) and the base (200) may also be formed in a tetragonal shape when the internal surface of the cover can (100) is formed in a tetragonal shape.

In such condition, when considering the cylindrical-shaped bobbin (300) accommodated in the housing (400), each of the magnet portions (510) of the actuator (500) may be disposed at every edge that is empty space in the housing (400), in order to efficiently utilize internal space of the cover can (100). That is, the magnet portion (510) may include four magnets (511, 512, 513, 514) disposed at a predetermined interval of ninety degree angle at an internal surface of the housing (400).

Meanwhile, the camera module according to an exemplary embodiment of the present disclosure may further include a Hall sensor portion (900) configured to sense a movement of the magnet portion (510) by being provided at the substrate (600). The Hall sensor portion (900) may sense intensity and phase of the applied voltage and the current flowing in the coil, and may interact with the substrate (600) to precisely control the actuator (500).

The Hall sensor portion (900) may be arranged at an upper surface of the substrate (600). Otherwise, the Hall sensor portion (900) may be arranged by being electrically connected to a lower surface of the substrate (600), in view of the fact that the second coil portion (530) may be mounted or patterned on the upper surface of the substrate (600).

In addition, the Hall sensor portion (900) may be provided on a straight line with the magnet portion (510) based on an optical axis. The Hall sensor portion (900) may two Hall sensors each provided at two mutually adjacent edges of the substrate (600). Such Hall sensors may be accommodated in the Hall sensor accommodation groove (212) of the base (200) as illustrated in FIG. 3.

The Hall sensor portion (900) may be arranged to be adjacent to the second coil portion (530) rather than adjacent to the magnet portion (510). However, the effect of the second coil portion (530) is inconsiderable with regard to sensing the movement of the magnet portion (510), in view of the fact that the intensity of electromagnetic field generated from the magnet is hundreds of times larger than that of the electromagnetic field generated from the coil.

Meanwhile, the Hall sensor portion (900) may be arranged at an external surface of the bobbin (300) or at a groove portion formed at the external surface of the bobbin (300), rather than arranged at the substrate (600). In addition, the first coil pattern portion (520) may be arranged at the external surface of the bobbin (300) and the Hall sensor portion (900) may be arranged at an internal side of the first coil pattern portion (520). In such case, the Hall sensor portion (900) may be invisible from the outside by being concealed by the first coil pattern portion (520). In addition, the Hall sensor portion (900) may be arranged at an external side of the first coil pattern portion (520).

In a case when the Hall sensor portion (900) is disposed in such manner at an external side of the bobbin (300), a terminal of the Hall sensor may be electrically connected to the upper spring (720) or the lower spring (710) to receive electric power applied by the substrate (600). In such case, the housing (400) disposed at a position responding to the Hall sensor may include a sensing magnet (not illustrated) that is arranged independently of the magnet portion (510). The Hall sensor portion (900) may sense a position of the bobbin (300) by sensing magnetic force of the sensing magnet.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments. Therefore, the technical scope of the rights for the present disclosure shall be decided by the claims and equivalents thereof.

What is claimed is:

1. A lens driving device comprising:
   a housing;
   a bobbin disposed at an inner side of the housing;
   a first substrate disposed on an outer lateral surface of the bobbin;
   a first coil mounted on the first substrate;
   a magnet disposed on the housing and facing the first coil;
   a base disposed below the housing;
   a second substrate disposed between the housing and the base;
   a second coil mounted on the second substrate, and facing the magnet;
   a first spring connecting between the bobbin and the housing; and
   a second spring connecting between the housing and the base,
   wherein the first substrate is a flexible substrate, and is bent along at least a portion of the outer lateral surface of the bobbin,
   wherein the first substrate is electrically connected to the first spring,
   wherein the first spring is electrically connected to the second spring,
   wherein the second spring is electrically connected to the second substrate,
   wherein the first coil is formed in a coil pattern formed at the flexible substrate,
   wherein the flexible substrate comprises a coil part formed with the coil pattern, and a protrusion part protruding from the coil part,
   wherein the first spring comprises a first protrusion portion and a second protrusion portion spaced apart from each other, and
   wherein the protrusion part is electrically connected to the first protrusion portion and the second protrusion portion.

2. The lens driving device of claim 1, wherein the first coil is disposed to face a lateral surface of the magnet, and wherein the second coil is disposed to face a lower surface of the magnet.

3. The lens driving device of claim 1, wherein the first coil is a single coil pattern formed at the first substrate.

4. The lens driving device of claim 1, wherein the first coil is a two-coil pattern formed at the first substrate.

5. The lens driving device of claim 1, wherein the first coil is a four-coil pattern formed at the first substrate.

6. The lens driving device of claim 1, wherein the first coil has an annular shape when the first substrate is developed.

7. The lens driving device of claim 1, further comprising:
   a third spring connecting between the bobbin and the base, and
   wherein the first spring is located above the third spring.

8. The lens driving device of claim 1, wherein the magnet includes a center portion having a neutral polarity, an upper portion disposed over the center portion, and a lower portion disposed under the center portion; and
   wherein the upper portion of the magnet and the lower portion of the magnet have opposite polarity arrangements.

9. The lens driving device of claim 1, wherein the magnet includes a first magnet part and a second magnet part disposed under the first magnet part, and
   wherein polarity arrangement of the first magnet part and second magnet part are divided into an inner side and an outer side.

10. The lens driving device of claim 1, wherein the second coil is a four-coil pattern disposed on an upper surface of the second substrate, wherein the magnet includes a first magnet, a second magnet, a third magnet, and a fourth magnet; and wherein the four-coil pattern of the second coil respectively face each of the first magnet, the second magnet, the third magnet, and the fourth magnet.

11. The lens driving device of claim 1, further comprising:
a Hall sensor portion configured to sense a movement of the lens driving device by being mounted at the first substrate.

12. The lens driving device of claim 11, wherein the base includes a Hall sensor accommodation groove accommodating the Hall sensor portion.

13. The lens driving device of claim 11, wherein the Hall sensor portion is provided in a straight line with the magnet based on an optical axis.

14. A camera module comprising:
an image sensor;
a lens disposed over the image sensor; and
the lens driving device of claim 1.

15. A mobile device comprising the camera module of claim 14.

16. A lens driving device comprising:
a housing;
a bobbin disposed at an inner side of the housing;
a first substrate disposed on an outer lateral surface of the bobbin;
a first coil mounted on the first substrate;
a magnet disposed on the housing and facing the first coil;
a base disposed below the housing;
a second substrate disposed between the housing and the base;
a second coil mounted on the second substrate and facing the magnet;
a first spring connecting between the bobbin and the housing; and
a second spring connecting between the housing and the base;
wherein the first substrate is a flexible substrate and is bent along at least a portion of the outer lateral surface of the bobbin,
wherein the first substrate is electrically connected to the first spring,
wherein the first spring is electrically connected to the second spring,
wherein the second spring is electrically connected to the second substrate,
wherein the magnet comprises a first magnet part and a second magnet part disposed under the first magnet part, and
wherein a length of the second magnet part is greater than a length of the first magnet part in a direction of an optical axis.

17. A lens driving device comprising:
a housing;
a bobbin disposed at an inner side of the housing;
a first substrate disposed on an outer lateral surface of the bobbin;
a first coil mounted on the first substrate;
a magnet disposed on the housing and facing the first coil;
a base disposed below the housing;
a second substrate disposed between the housing and the base;
a second coil mounted on the second substrate and facing the magnet;
a first spring connecting between the bobbin and the housing; and
a second spring connecting between the housing and the base;
wherein the first substrate is a flexible substrate and is bent along at least a portion of the outer lateral surface of the bobbin,
wherein the first substrate is electrically connected to the first spring,
wherein the first spring is electrically connected to the second spring,
wherein the second spring is electrically connected to the second substrate,
wherein the bobbin comprises at least two flange portions vertically protruding from an outer circumferential surface of the bobbin,
wherein the housing comprises a plurality of accommodation portions accommodating the flange portions,
wherein the flange portion of the bobbin is overlapped with the accommodation portion of the housing in an optical axis direction,
wherein a lower surface of the flange portion of the bobbin faces an upper surface of the accommodation portion,
wherein the first coil is formed in a coil pattern formed at the first substrate,
wherein the first substrate comprises a coil part formed with the first coil pattern, and a protrusion part protruding from the coil part,
wherein the first spring comprises a first protrusion portion and a second protrusion portion spaced apart from each other, and
wherein the protrusion part of the first substrate is electrically connected to the first protrusion portion and the second protrusion portion of the first spring.

* * * * *